April 29, 1969

H. L. BURKS 3,441,034

AUTOMATIC BEER COIL CLEANER

Filed March 7, 1966

INVENTOR.
HOWARD L. BURKS

BY Jerome P. Bloom

ATTORNEY

April 29, 1969  H. L. BURKS  3,441,034
AUTOMATIC BEER COIL CLEANER
Filed March 7, 1966  Sheet 2 of 2
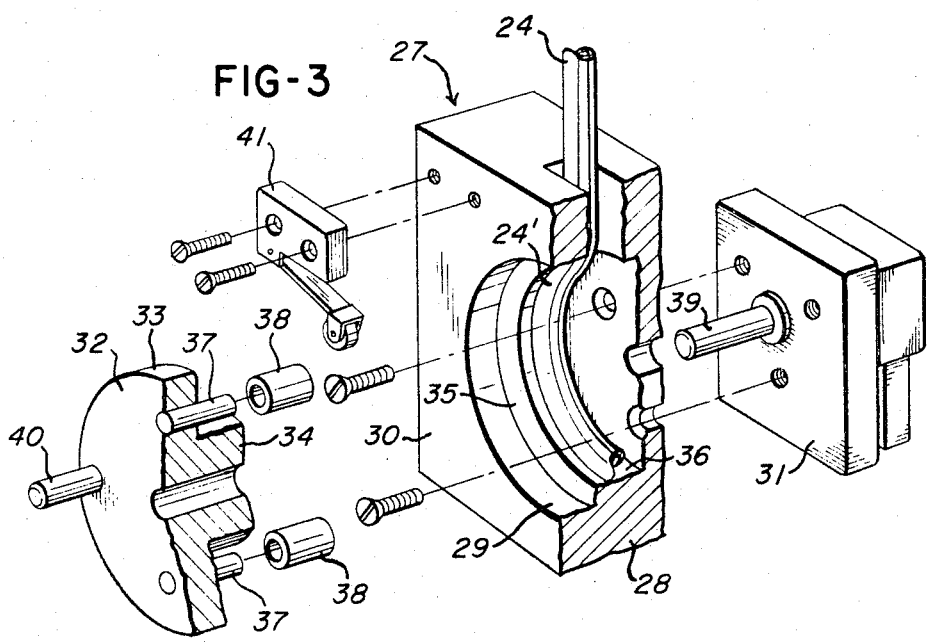
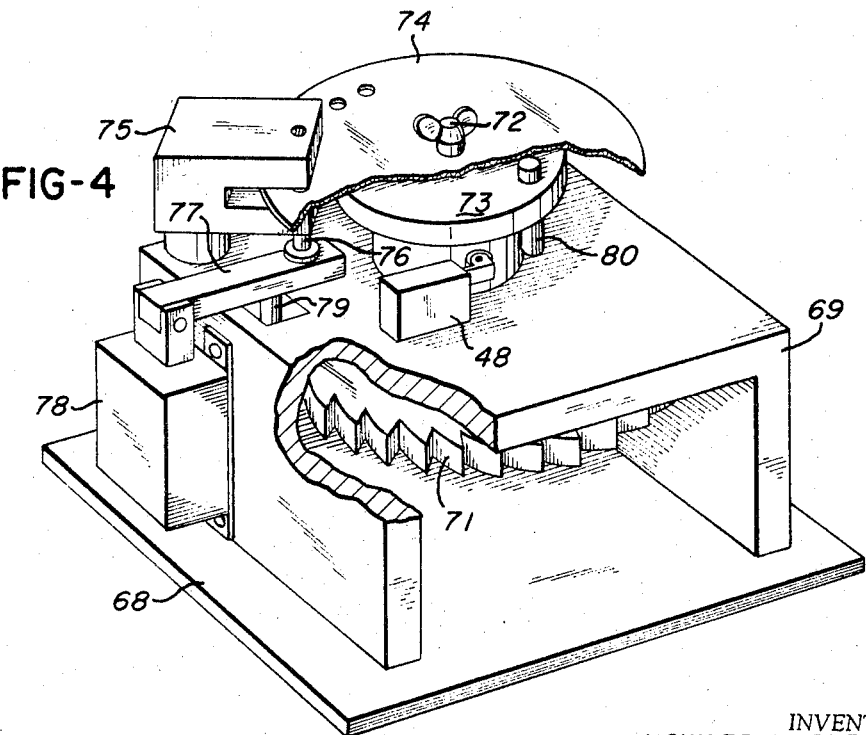
INVENTOR.
HOWARD L. BURKS
BY Jerome P. Bloom
ATTORNEY United States Patent Office 3,441,034
Patented Apr. 29, 1969

3,441,034
AUTOMATIC BEER COIL CLEANER
Howard L. Burks, Springfield, Ohio, assignor of one-half to Jack K. Follrath, Springfield, Ohio
Filed Mar. 7, 1966, Ser. No. 532,339
Int. Cl. B08b 3/10, 9/02
U.S. Cl. 134—58                                        12 Claims

ABSTRACT OF THE DISCLOSURE

A system and apparatus for flushing and cleansing fluid flow lines including means for providing a surging flow of a fluid medium through the flow line and operatively related means for producing a pulsed injection of a cleansing medium in the flow line to provide, together with the surging flow, intermittent pulsations which induce a scouring of the flow line.

---

This invention relates to a new and improved system and apparatus for flushing and cleansing flow lines. It has particular advantage as applied to beer dispensing and like equipment and will be so described though not so limited, either as to form or application.

The unique nature of the invention will be particularly illustrated in reference to equipment used in the dispensing of draft beer. Such equipment includes flow lines which respectively connect at one end to the head of a keg of beer and at the other end to a conventional tap. Intermediate the keg and the tap each line is so formed to provide it with cooling coils. As a tap is opened and beer flows through the delivery line, sediment from the beer tends to attach to the wall of the tube that forms the line, particularly in the area of its cooling coils. If the line is not frequently and properly cleaned, the accumulated sediment assumes a state which produces undesirable odors and affects adversely the quality and flavor of the dispensed beer.

Conventional means and methods heretofore used in an effort to obviate the problem above described have been relatively unsatisfactory. In most instances they have been such to discourage the frequent cleansing of the flow lines which is so essential not only to preserving the flavor of the draft beer but also from a health standpoint. In many instances of the prior art the cleansing apparatus utilized has proven relatively inefficient in that objectionable traces of cleanser still remain in the line after the cleansing procedure has been completed. This last also affects adversely the quality and flavor of dispensed beer.

Therefore, a primary object of the present invention is to provide a system and apparatus for cleansing and/or flushing a flow line which is economical to fabricate, most efficient and satisfactory in use, adaptable to a wide variety of applications and unlikely to malfunction.

A further object of the invention is to provide flushing and cleansing apparatus which may be simply installed in conjunction with any line flow system.

Another object of the invention is to provide a unique system for flushing and cleansing flow lines the cycle of which is completely automatic.

An additional object of the invention is to provide a unique means and method for simply and effectively cleansing and/or flushing the delivery lines of a beer dispensing system.

A further object of the invention is to provide apparatus of the type described capable of pulsing cleansing fluid through a flow line in a manner to insure the line is left in a condition free of previously contained sediment and also free of any undesirable trace of cleanser.

Another object of the invention is to provide novel means for injecting a cleansing medium into a fluid flow line.

An additional object of the invention is to provide a cleansing system for flow lines possessing the advantageous special features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a generally schematic diagram of a beer dispensing system incorporating the present invention, electrical controls being omitted for clarity of disclosure;

FIG. 3 is an exploded perspective view of a pump for introducing cleanser in the system of FIG. 1; and FIG. 4 is a further perspective view illustrating the details of a recording mechanism utilized in the system of FIG. 1.

Like parts are indicated by similar characters of reference throughout the several views.

Figure 1:
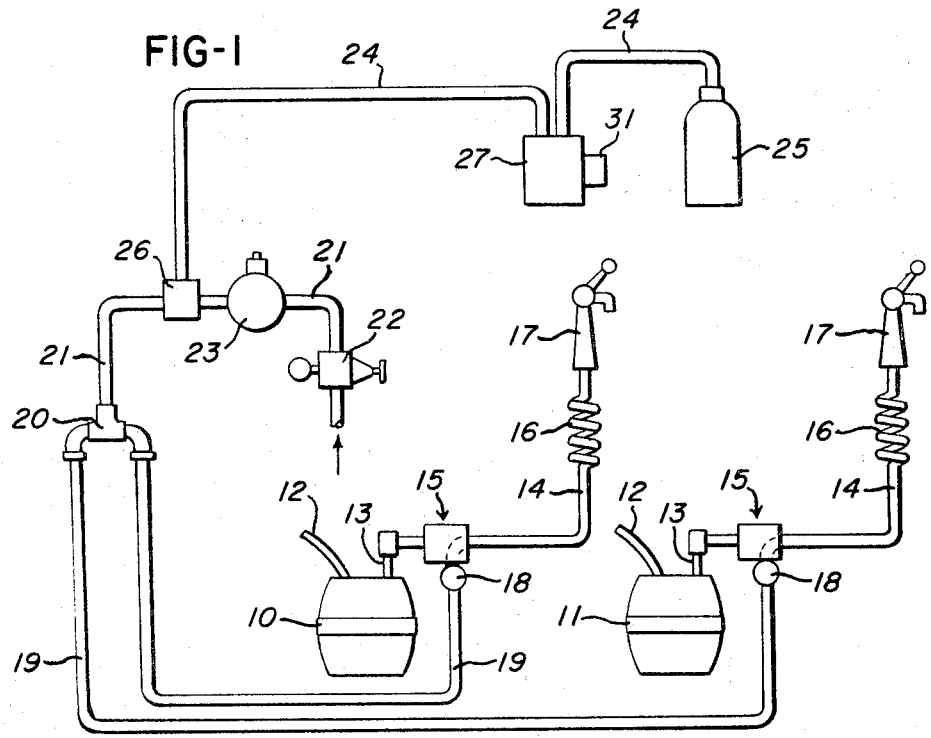

As previously indicated, the system revealed in the drawings relates to the apparatus particularly adapted for the dispensing of draft beer. There shown are a pair of beer kegs 10 and 11. The beer in each keg is maintained under pressure by air delivered thereto through the medium of a hose 12. The source of this air is not shown since in and of itself it forms no particular part of the present invention.

Mounted in the top of each keg is a tap rod 13 which opens to one end of a delivery line 14. Incorporated in each line 14 immediately adjacent and following the rod 13 is a normally open solenoid operated control valve 15. To its end remote from the related keg each delivery line is formed with a series of cooling coils 16 and terminates in a discharge tap 17. The latter incorporates a conventional on-off control valve.

Under normal serving conditions, on opening a tap 17 the beer in the related keg flows under existing pressure to and through the tap rod 13, the line 14, including the normally open solenoid operated valve 15, and the cooling coils 16 to eventually exit through the open valve of the tap 17.

It may be further seen with particular reference to the schematic diagrams of the accompanying drawings that a check valve 18 opens into each delivery line 14 at the downstream side of the included control valve 15. The valve 18 caps the discharge end of a conduit 19. The conduits 19 related to each delivery line 14 are mutually connected by means of a Y fitting 20 to a flow line 21. The line 21 serves as the primary conduit for flushing and cleansing fluids in a manner to be further described.

In the practice of the invention water from any suitable source is directed to and through the flow line 21 by way of a regulator 22. The latter is used to control the water pressure. Connected in the line 21 between the regulator 22 and Y fitting 20 is a solenoid controlled water valve 23 which in the inoperative condition of the system is normally closed.

A flexible conduit assembly 24 connects at one end to a bottle 25 which serves as a reservoir for a cleansing fluid and at the other end opens by way of a one way valve 26 to the flow line 21, between the water valve 23 and the Y fitting 20. Valve 26 permits the flow of cleansing fluid to the line 21 but not reversely.

In the example illustrated, an intermediate section 24' of the conduit 24 leads to and through a pump mechanism 27. The pump 27 includes a housing 28 having a stepped recess 29 in one face 30. At its opposite face the pump housing fixedly mounts a drive motor 31. The pump incorporates a rotor 32 which includes a plate portion 33 outermost and a reduced hub portion 34 which projects inwardly to the recess base. The plate portion 33 caps the recess 29, its projected periphery seating to and bearing on a shoulder 35 formed by the step in the recess wall. Inwardly of the shoulder 35, the recess wall section 36 is relatively concentric to and spaced outwardly from the rotor hub. Also projecting inwardly from the rotor plate portion 33 are a pair of fixed pins 37 rotatably mounting cylindrical roller elements 38. The elements 38 are thereby almost diametrically spaced and arranged to move with the rotor 32 in a circular path which is immediately inward of the recess wall section 36.

The pump housing is suitably apertured for the section 24' of the conduit 24 to be threaded therein, caused to seat on an extended portion of the wall section 36 and to exit from the housing whence it is directed to the flow line 21. As may be observed in FIG. 3 of the drawings, the motor drive shaft 39 is keyed to the rotor hub 34. The pump rotor elements 38 are so related to the conduit section 24' that on drive of the rotor these rollers are caused to successively and progressively squeeze the conduit section 24' and thereby draw to and force from the pump housing measured amounts of the cleansing fluid previously stored in the reservoir 25.

Projected in a sense outwardly of the rotor plate 33, in diametrically spaced relation, respectively displaced about 90° from the pins 37, are a pair of control pins 40. Mounted thereabove to project from the face 30 of the pump housing 28 is a normally closed switch 41. The latter is included in the control circuit for the solenoid of the water valve 23, its condition being cyclically changed by the pump rotor at the end of each 180° travel of the rotor 32.

Figure 2:
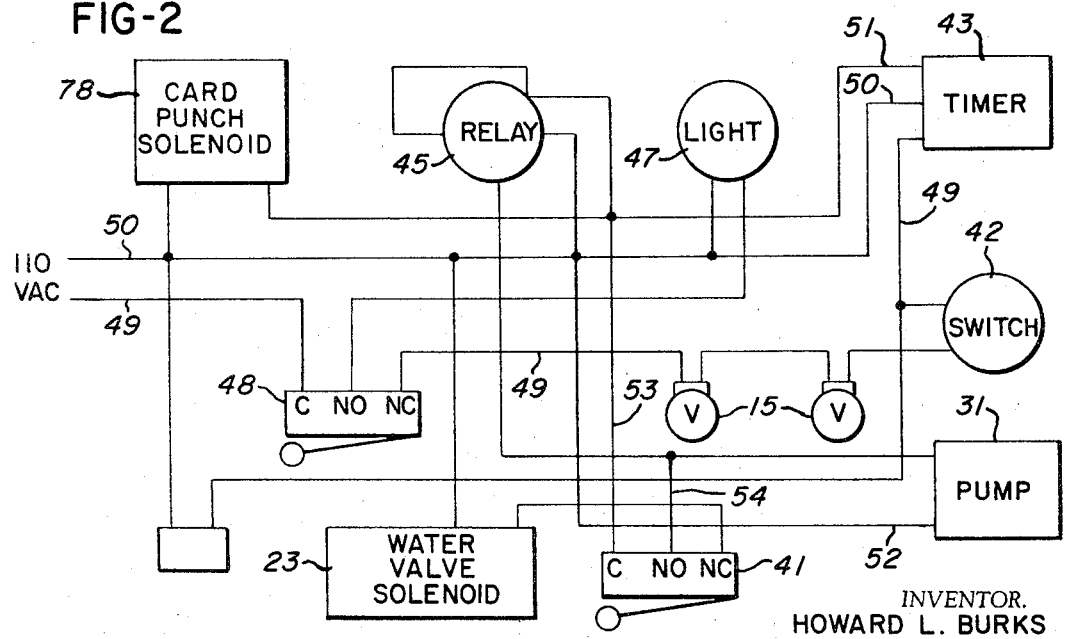
FIG. 2 is a generally schematic diagram of the control circuit embodied in the system of FIG. 1.

The controls utilized in the invention system are simply illustrated in FIG. 2 of the drawings in a diagram form. As there seen, such controls include a main toggle switch 42, a timer 43 and related thereto a relay tube 45. Also shown in a branch circuit is a solenoid operated card punch 78, a signal light 47 and card switch 48, the purpose and nature of which shall be further described.

In reference to FIG. 2, there is a source of electrical power from which extend the lead lines 49 and 50. The lines 49 and 50 are connected to the timer 43, the line 49 incorporating the switch 48, the normally open solenoid controlled valves 15, and the normally open switch 42. On closing the switch 42, the valves 15 are caused to close to seal the beer kegs 10 and 11 and condition the timer for use. Further, a line 51, normally disconnected from the power source, extends from the timer 43 and through the relay tube 45 to form one lead to the pump motor 31. The other lead of the motor connects to the line 50 by way of a line 52. The leads from the solenoid of the valve 23 are electrically connected to line 50 on the one hand and on the other to the line 51 by way of the pump switch 41. This places the water valve in direct connection with the timer. The timer is so arranged that setting the timer for use provides power through line 51 once the switch 42 is closed. Thus, as the timer is set, the solenoid of water valve 23 is energized and the valve is caused to open. During the operation of the invention system, there is a cyclic closing of the water valve each time the switch 41 is engaged by the pins 40. In this event note the available interconnection of the line 51 to one lead of the pump motor 31 by way of a line 54 and through a normally open contact of the switch 41.

The solenoid 78 of the punch 76 is shown in the diagram of the control circuit as connected in line 51, between the timer 43 and the line 50. An available circuit is also defined from lead 49 through the normally open contact of switch 48 and light 47 to the lead line 50.

No particular additional explanation of the control circuit seems necessary since, with existing disclosure, the necessary electrical connections can be achieved by anyone versed in the art.

To complete the description of the illustrated embodiment of the present invention, reference is made to the FIG. 4 of the drawings. The system contemplates the use of a recording mechanism whereby visual indication may be had that a cleansing operation or series thereof have been duly performed. For this purpose there is here provided a record card 74 which is to be automatically marked or punched on the performance of each cleansing cycle. The recording mechanism as illustrated comprises a base 68 on which is fixed an inverted U-shaped housing 69. Disposed within the housing 69 in a plane parallel to the base 68 is a ratchet whel 71. The wheel 71 is fixed to the lower end of a post 72 projecting upward through the housing 69, fixed in bearing relation thereto. Fixed to the upper end of the post 72, is a table 73 and means for releasably clamping to the table the disc shaped record card 74. The card is of a size that its periphery overlaps and projects from the edge of the table 73 to be received in a slotted guide element 75. The bifurcations of guide 75 include vertically aligned apertures for passing the punch 76 which projects vertically upward from an underlying arm 77. The arm 77 is connected, in a suitable manner, to the solenoid control unit 78 the function of which is to raise and lower the arm and the punch. Also connected to project vertically downward from the punch arm 77 to and through the top of the housing 69 is a pin 79 having conventionally connected means for engaging the teeth of the ratchet wheel 71. As may be readily understood, the pin 79 is a stepping device with related apparatus so arranged that each time the punch element 76 drops down it resultingly causes the wheel 71 to be stepped and to move the card 74 therewith to a succeeding position of alignment with the holes in guide 75. Conventional spring means, not shown, are utilized to hold the ratchet wheel in any position to which the whel is stopped. Fixed to project and depend downwardly from a peripheral portion of the rotatable table 73 is a pin 80 which functions in conjunction with the switch 48 in a manner to be further described.

For a complete understanding of the invention and the system achieved thereby, one must understand a complete cycle of its operation. The operation is initiated on closing the switch 42. This provides power to the timer 43 and induces the valves 15 to close and to seal the beer kegs 10 and 11. The timer is so arranged that on setting thereof power is directed also through the line 51, as a result of which both the pump motor 31 and the solenoid of the water valve are energized and the valve 23 is caused to open and the operation of the pump motor is immediately initiated.

Preliminary, of course, to the closing of the switch 42, the taps 17 are opened.

There being a continuously available supply of water under pressure, once the valve 23 is opened, there is a pressured flow thereof through the line 21 and the fitting 20 to conduits 19. The surging water moves through the one way valves 18 to enter and pass through the beer delivery lines 14. The downstream sides of the valves 15 are exposed to this rushing flow of water and are cleansed in the process, along with the delivery lines 14.

At the same time the water is moving to the beer delivery lines through the flow lines 21, the rotor 32 of the pump 27 is cycling, the rollers 38 thereof successively and progressively squeezing cleansing fluid to and through the flexible conduit 24 to enter the flow line 21 on the downstream side of the water valve 23 in small pulsed charges. The cleansing fluid is of course entrained in the water and provides active components which are effective therewith to scour the lines through which it moves, and it further enables the pressured flow of water to carry therewith the sediment attached to the delivery line. As the rotor of the pump 27 turns, the pins 40 which project outwardly thereof do, once in every 180° of the rotor travel, engage switch 41 to open the normally closed contact thereof and thereby interrupt the power to the solenoid of the water valve 23. This causes the valve 23 to momentarily close during which instant the pump 27 is particularly able to cause the pulsed pressured injection of cleansing fluid to line 21. In this manner the invention achieves what constitutes a pulsing flow through the lines to be cleansed and at the same time an optimal incorporation of the cleansing fluid. The intermittent pulsations thereby achieved create a more effective means of cleansing the entire system to which the invention is applied.

In the embodiment illustrated complete cleaning would require about five minutes time, which time would be set on timer 43 when switch 42 is closed. The relay tube 45 is so designed that at the end of the first two minute interval of the cleansing procedure the heating element thereof breaks the circuit to the pump motor 31. This, however, does not interrupt the intermittent surging flow of water which continues for three additional minutes, in the same pulsing or pounding fashion. During this latter period there is a continued flushing of the lines and a scouring from the walls of the lines of any possible traces of active cleanser components. At the end of the five minute interval the timer returns to zero at which point the connection with the line 51 is broken, relieving power at the solenoid of the water valve 23. This valve 23 then closes, assuming its normal inoperative condition.

At the time the timer was set a further operation took place. In this instance the solenoid controls of the punch 76 were activated to draw the punch down and cause the pin 79 to influence an index of the ratchet wheel 71 and turn the record card a single increment from its previous position. When the timer 43 reaches zero the power to the solenoid 78 is cut, in which event conventional spring means incorporated in the solenoid causes the punch 76 to move upwardly through the slotted guide 75 and to pass through the peripheral edge of the punch card at the station achieved by the previous index of the ratchet wheel 71. This provides the card with a graphic indication of the fact that a flushing and cleansing procedure has taken place. Thus, the card 74 provides a continuing record of the number of times the system has been flushed and cleansed from the date at which the card was placed on the table 73. When the card is used up, in reference to its record taking, the pin dependent from the table 73 engages the switch 48 preventing the achievement of a complete functioning circuit through the lead lines 49 and 50. Instead a circuit is caused to be closed to energize the light 47. On seeing the light 47, one recognizes the need for replacement of the card 74.

It is a point of interest in this system that each increment of cleanser injected in the flow line 21 is so timed to be followed by a jet-like surge of the water which surge is produced as the water valve, momentarily closed, is re-opened. This relative timed introduction of the cleanser obviates the need for injecting the cleanser against high water pressure with consequent diminishing of the work required of the pump 27 and a reducing of the normally anticipated wear and tear on the pump and associated apparatus.

Thus, the system as above described has particular advantage and utility in application to a beer dispensing installation but, as is obvious, its application need not be so limited. Moreover, the system is significant in that once the cleansing is initiated, the cycle is completely automatic and completely effective within a relatively short interval of time.

It should be recognized that not only is the apparatus as employed in the system made completely automatic as to its cyclic operation but the invention is so applied to make the use thereof a manner of utmost simplicity and economy. It should also be recognized that the simplicity and speed with which the invention may achieve its intended purpose is such to encourage its use and thereby create more helpful conditions in reference to the dispensing in particular of food-like substances.

From the above descrpition it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus for flushing and/or cleansing flow lines including means for injecting in a flow line a fluid medium in a condition of pulsating flow and means for limiting the movement of said pulsating fluid through the flow line to a substantially uni-directional flow, wherein said injecting means includes a source providing for the delivery of said fluid medium in a pressured flow, a conduit means directing its delivery, and means connected to intermittently interrupt said pressured flow through said conduit means to produce in the delivery thereof to said flow line the said condition of pulsating flow, and further means for injecting a charge of active cleanser in said delivery conduit in a timed relation to the movement of said fluid medium in said pulsating flow.

2. Apparatus as described in claim 1 characterized by said cleanser injecting means including a flexible conduit having to one end a one-way connection with said delivery conduit means and at its other end a connection with a source of active cleanser, an intermediate portion of said flexible conduit having in operative relation thereto a means for drawing to and transmitting through said flexible conduit to said delivery conduit means the cleanser from said source.

3. Apparatus as described in claim 2 characterized by said drawing and transmitting means consisting of elements of a pump successively operating to squeeze and release said intermediate portion of said flexible conduit.

4. Apparatus as described in claim 3 characterized by means operatively relating the said pump elements and said interrupting means to produce the introduction of said cleanser to said delivery conduit at intervals generally corresponding to the intervals of interruption of said pressured flow of said fluid medium.

5. Apparatus as described in claim 1 characterized by said cleanser injecting means consisting of a pump housing having a cavity, a flexible conduit means a portion of which threads through said housing to have a portion rest on a wall portion of said cavity and a rotor means incorporated in said cavity formed to produce in the rotation thereof a successive and progressive squeezing of a portion of said flexible conduit whereby on connection of one end of said conduit to a source of active cleanser and the other to said delivery conduit to produce the delivery to said conduit of pulsed charges of said active cleanser.

6. Apparatus for flushing and/or cleansing flow lines including means for injecting in a flow line a fluid medium in a condition of pulsating flow and means for limiting the movement of said pulsating fluid through said flow line to a substantially uni-directional flow, and characterized by means providing a source for producing a pressured flow of said fluid medium for delivery to said flow line, means for alternately passing or blocking said flow to produce thereby the delivery of said fluid medium in said condition of pulsating flow, pump means operatively related to said blocking means to provide a relatively timed injection of an active cleanser component in the path of the successive pulsations of said pressured flow and means in connection with said pump and blocking means to limit the interval of their respective function during a cleansing cycle.

7. A system for flushing and/or cleansing the flow line of beer or like dispensing equipment, including means for injecting in a flow line a fluid medium in a condition of pulsating flow and means for limiting the movement of said pulsating fluid through said flow line to a substantially unidirectional flow, the flow line having to one end means defining a connection thereof to a keg of beer and at the other end a tap, a normally open valve incorporated in said flow line adjacent said keg, means for closing said valve, further means for opening said tap, means providing a source for pressured flow of said fluid medium, a selectively closeable valve metering said flow, a flexible conduit one end of which connects to discharge in the path of said pressured flow and the other end of which connects to a source of an active cleanser and means for drawing to and delivering from said flexible conduit a series of pulsed charges of said active cleanser for a timed pick up thereof and entrainment by said fluid medium in moving to and through said flow line.

8. A system as described in claim 7 characterized by a timer for connection to a source of power, said timer being operatively connected to said selectively closeable valve and said means for pulsing said cleanser, switch means the closing of which connects the timer to the source of power, said normally open valve being interrelated through said switch means to said source of power to also close on closing of said switch means and means operated by said pulsing means for intermittently disabling the power connection to said selectively closeable valve in a manner to produce the resultant delivery of the fluid medium to the flow line in the said condition of pulsating flow.

9. Apparatus for flushing and/or cleansing flow lines including means for injecting in a flow line a fluid medium in a condition of pulsating flow and means for limiting the movement of said pulsating fluid through said flow line to a substantially uni-directional flow, characterized by means for the delivery of said fluid medium in a pressured flow incorporating therein a normally closed valve and a pump having a motor, a timer, means for connecting said timer to a source of power including a control switch the closing of which brings power to said timer, said timer having a normally inoperative connection to said normally closed valve and to the motor of said pump, means energized by the setting of said timer to transmit power to drive said pump motor and to induce the opening of said normally closed valve and means in connection with said pump operatively related to intermittently disable the connection between said timer and said normally closed valve to produce thereby the intermittent closing of the last named valve and the resulting movement of the pressured flow of the fluid medium to and through said flow line in a condition of pulsating flow, said pump having means in connection therewith for injecting components of active cleanser in and for entrainment by said pulsating flow of the fluid medium.

10. A system as described in claim 9 characterized by means in operative relation thereto for recording the occurrence of a flushing and cleansing of said flow line including a record element, means in connection with said record element for indexing thereof in automatic response to a closing of said control switch and means responding to a completion of the cleansing cycle as dictated by the setting of the timer to automatically and correspondingly mark an indication thereof on said record element.

11. Apparatus for flushing and/or cleansing flow lines including means providing a surging flow of a fluid medium to and through a flow line, and operatively related means for producing a pulsed injection of a cleansing medium in said flow line to provide, together with the surging flow, intermittent pulsations which induce a scouring and a cleansing of said flow line, said means providing the surging flow of a fluid medium including an electrically energizable valve for passing or interrupting the flow and characterized further by switch means operable by said injecting means alternately to energize and de-energize said valve to produce alternating intervals of flow and no-flow of said fluid medium, said injecting means including a pump and means operable by the pump to open and close said switch means in a timed relation to the pulsed injections of the cleansing medium such that the cleansing medium is introduced in the no-flow intervals of said fluid medium in said flow line.

12. Apparatus according to claim 11 characterized in that said pump includes a rotor and relatively angularly displaced means on said rotor operable respectively and in an alternating relation to produce the pulsed injection of the cleansing medium in the flow line and upon said switch means during rotation of said rotor.

References Cited

UNITED STATES PATENTS

| | | | |
|---|---|---|---|
| Re. 19,335 | 10/1934 | Uroukoff | 134—100 XR |
| 829,367 | 8/1906 | Chandler | 134—100 XR |
| 2,535,204 | 12/1950 | Hageline | 134—100 XR |
| 2,818,076 | 12/1957 | Erling | 134—169 XR |
| 3,119,399 | 1/1964 | Bender | 134—169 XR |
| 3,230,570 | 1/1966 | Flippen | 15—548 XR |
| 3,274,632 | 9/1966 | Franklin | 15—29 |

ROBERT L. BLEUTGE, *Primary Examiner.*

U.S. Cl. X.R.

134—100, 169